United States Patent [19]
Alexander et al.

[11] Patent Number: 5,420,808
[45] Date of Patent: May 30, 1995

[54] CIRCUITRY AND METHOD FOR REDUCING POWER CONSUMPTION WITHIN AN ELECTRONIC CIRCUIT

[75] Inventors: Michael C. Alexander, Austin; Arturo L. Arizpe, Buda; Gianfranco Gerosa; James A. Kahle, both of Austin; Aubrey D. Ogden, Round Rock, all of Tex.

[73] Assignees: International Business Machines Corporation, Armonk, N.Y.; Motorola, Inc., Schaumburg, Ill.

[21] Appl. No.: 61,397

[22] Filed: May 13, 1993

[51] Int. Cl.6 ............................................. G06F 1/32
[52] U.S. Cl. .................................... 364/707; 395/550
[58] Field of Search ................ 364/707; 331/143; 395/550

[56] References Cited

U.S. PATENT DOCUMENTS

| | | | |
|---|---|---|---|
| 4,240,150 | 12/1980 | Ebihara et al. | 364/705 |
| 4,285,043 | 8/1981 | Hashimoto et al. | 364/707 |
| 4,570,219 | 2/1986 | Shibukawa et al. | 364/200 |
| 4,615,005 | 9/1986 | Maejima et al. | 364/707 |
| 4,686,386 | 8/1987 | Tadao | 307/269 |
| 4,780,843 | 10/1988 | Tietjen | 364/707 |
| 4,851,987 | 7/1989 | Day | 364/200 |
| 4,893,271 | 1/1990 | Davis et al. | 395/550 |
| 5,083,266 | 1/1992 | Watanabe | 395/575 |
| 5,086,387 | 2/1992 | Arroyo et al. | 395/550 |
| 5,101,283 | 3/1992 | Seki et al. | 358/456 |
| 5,113,251 | 5/1992 | Ichiyanagi et al. | 358/75 |
| 5,117,443 | 5/1992 | Shires | 375/111 |
| 5,153,535 | 10/1992 | Fairbanks et al. | 331/143 |
| 5,162,667 | 11/1992 | Yasui et al. | 307/272.2 |
| 5,167,024 | 11/1992 | Smith et al. | 395/375 |
| 5,222,239 | 6/1993 | Rosch | 385/750 |

FOREIGN PATENT DOCUMENTS

0229692A2 8/1987 European Pat. Off. .
0579369A1 3/1993 European Pat. Off. .

OTHER PUBLICATIONS

IBM Technical Disclosure Bulletin, vol. 32, No. 8B, Jan. 1990, p. 373, "Dynamic Power Management by Clock Speed Variation".

IBM Technical Disclosure Bulletin, vol. 29, No. 9, Feb. 1987, pp. 3804–3807, "64K Static RAM Word and Bit Decoder Circuit".

IBM Technical Disclosure Bulletin, vol. 31, No. 12, May 1989, pp. 60–62, "Bit Line/Word Boost Circuit".

IBM Technical Disclosure Bulletin, vol. 32, No. 6A, Nov. 1989, pp. 400–404, "Performance Monitoring of VLSI Devices".

IBM Technical Disclosure Bulletin, vol. 32, No. 6B, Nov. 1989, pp. 362–367, "Minimizing Power in High Performance PLAs".

IBM Technical Disclosure Bulletin, vol. 33, No. 10A, Mar. 1991, pp. 440–442, "Battery Fail-Safe Mechanism for Personal Computer".

IBM Technical Disclosure Bulletin, vol. 34, No. 10B, Mar. 1992, pp. 380–385, "Automatic Correction of CRT Control Parameters".

IBM Technical Disclosure Bulletin, vol. 33, No. 5, Oct. 1990, pp. 237–238, "Interface of a Low-Power Keyboard for Lap-Top Computers".

IBM Technical Disclosure Bulletin, vol. 33, No. 4, Sep. 1990, pp. 474–477, "Technique for Monitoring a Computer System's Activity for the Purpose of Power Management of a DOS-Compatible System".

IBM Technical Disclosure Bulletin, vol. 29, No. 9, Feb. 1987, pp. 4122–4124, "System Power Savings by Automatic Sleep Mode".

Primary Examiner—David H. Malzahn
Attorney, Agent, or Firm—Michael A. Davis, Jr.

[57] ABSTRACT

A method and circuitry are provided, in which a first operation is performed with first circuitry. A second operation is performed with second circuitry. A first signal is generated in response to the first operation. A second signal is generated in response to the second operation. Power consumption is adjusted within the second circuitry in response to the first and second signals.

42 Claims, 6 Drawing Sheets

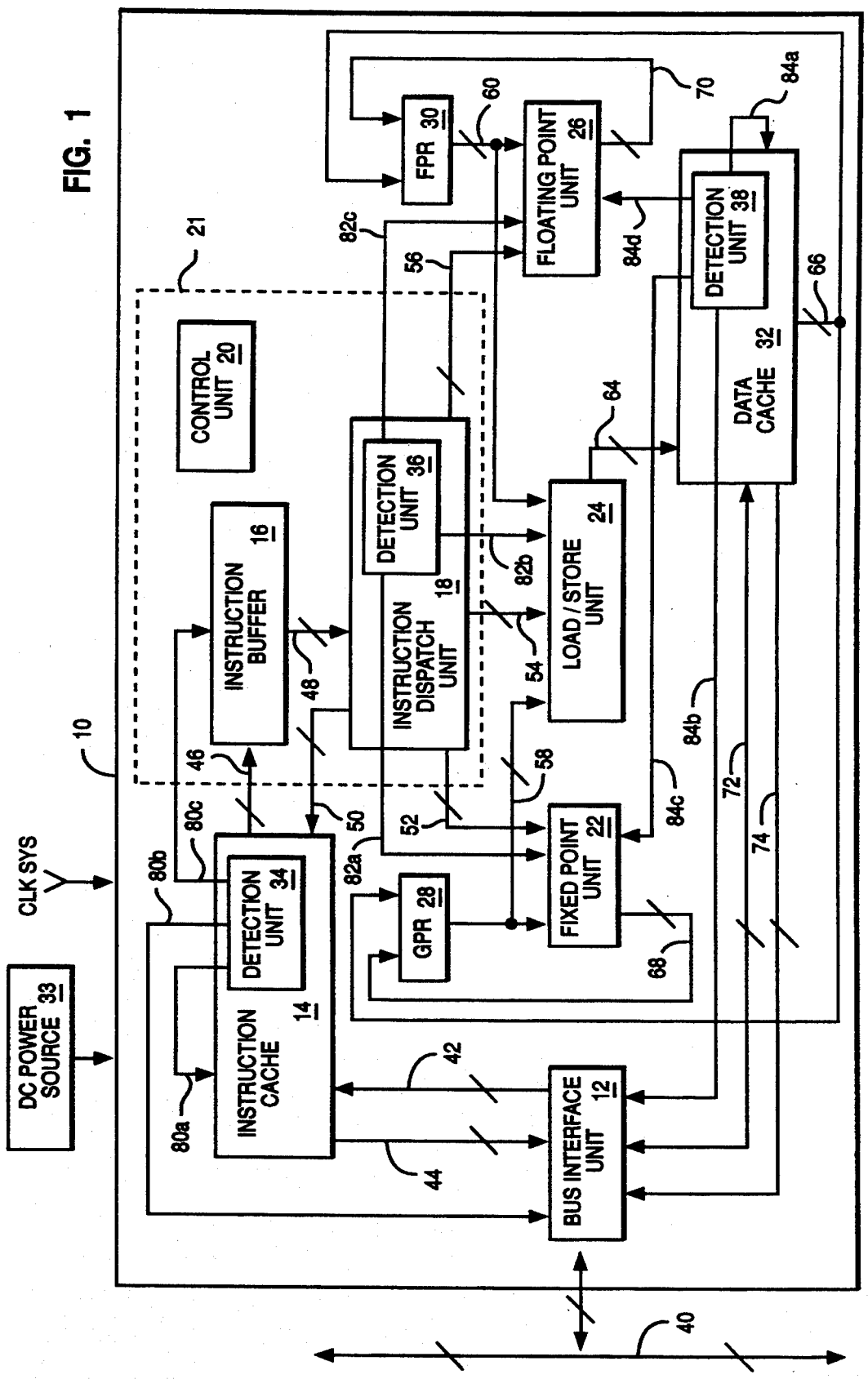

CIRCUITRY AND METHOD FOR REDUCING POWER CONSUMPTION WITHIN AN ELECTRONIC CIRCUIT

TECHNICAL FIELD OF THE INVENTION

This patent application relates in general to electronic circuits and in particular to a method and circuitry for reducing power consumption within an electronic circuit.

BACKGROUND OF THE INVENTION

In recent years, portable laptop computers have become increasingly popular. Frequently, such laptop computers are battery powered in order to enhance their portability. Preferably, a battery powered laptop computer operates for an extended period of time under battery power before its battery is either recharged or replaced.

Accordingly, it is important to reduce power consumption within an electronic circuit of the laptop computer, in order to extend the period of time during which the electronic circuit operates before recharging or replacing the battery. For this purpose, some previous techniques disable power or disable clock signals to the electronic circuit in response to a specified time elapsing without sensing a particular type of activity. A shortcoming of such previous "timer" techniques is that the electronic circuit can unnecessarily consume excess power while waiting for the timer to expire, even when the electronic circuit is not performing an operation.

Another shortcoming of such techniques is that some form of interrupt is used to reenable the power or clock signals to the electronic circuit in response to an immediate need for the electronic circuit to perform an operation. Accordingly, a delay occurs between the time when the electronic circuit is needed to perform an operation and the time at which the electronic circuit is actually reenabled. Consequently, performance of the electronic circuit is sacrificed by such previous techniques, so that they are not fully transparent to a user of the electronic circuit.

Thus, a need has arisen for a method and circuitry in which an electronic circuit consumes less excess power relative to previous techniques. Also, a need has arisen for a method and circuitry in which the electronic circuit does not unnecessarily consume excess power while waiting for a timer to expire. Further, a need has arisen for a method and circuitry for reducing power consumption within an electronic circuit, in which more performance of the electronic circuit is retained relative to previous techniques. Moreover, a need has arisen for a method and circuitry for reducing power consumption within an electronic circuit, which are more fully transparent to a user of the electronic circuit relative to previous techniques.

SUMMARY OF THE INVENTION

In a method and circuitry, a first operation is performed with first circuitry. A second operation is performed with second circuitry. A first signal is generated in response to the first operation. A second signal is generated in response to the second operation. Power consumption is adjusted within the second circuitry in response to the first and second signals.

In an integrated circuit, first circuitry generates a first signal. Second circuitry adjusts power consumption within only a portion of the integrated circuit in response to the first signal.

It is a technical advantage of the present invention that an electronic circuit consumes less excess power relative to previous techniques.

It is another technical advantage of the present invention that the electronic circuit does not unnecessarily consume excess power while waiting for a timer to expire.

It is a further technical advantage of the present invention that more performance of the electronic circuit is retained relative to previous techniques.

It is yet another technical advantage of the present invention that a method and circuitry are provided for reducing power consumption within an electronic circuit, which are more fully transparent to a user of the electronic circuit relative to previous techniques.

BRIEF DESCRIPTION OF THE DRAWINGS

An exemplary embodiment of the present invention and its advantages are better understood by referring to the following descriptions and accompanying drawings, in which:

FIG. 1 is a conceptual block diagram of an electronic circuit, according to an exemplary embodiment of the present invention;

DETAILED DESCRIPTION

Figure 2A:
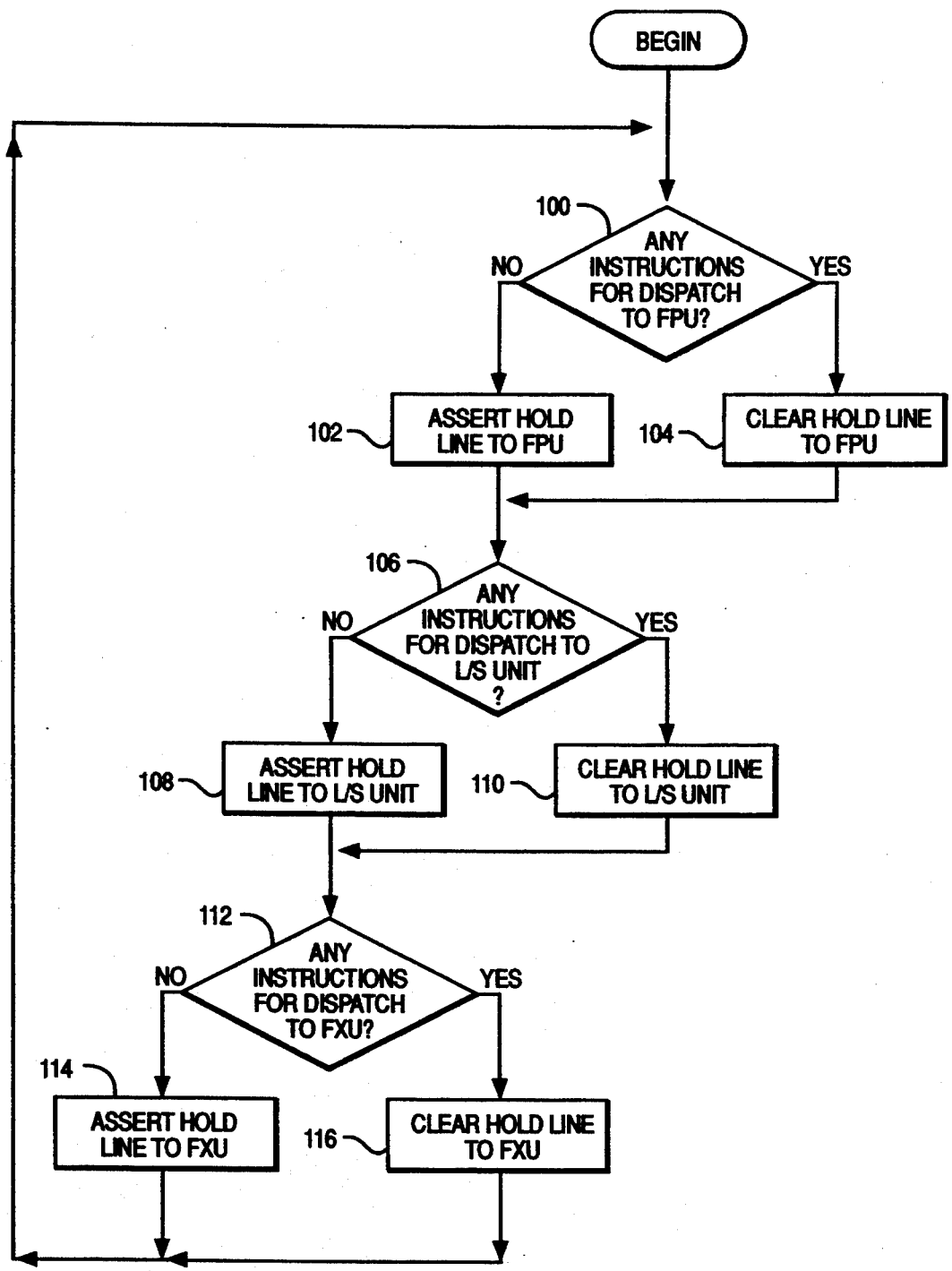
FIGS. 2a–c are flow charts of a method of reducing power in the electronic circuit of FIG. 1, according to the exemplary embodiment.

An exemplary embodiment of the present invention and its advantages are better understood by referring to FIGS. 1–4 of the drawings, like numerals being used for like and corresponding parts of the accompanying drawings.

FIG. 1 is a conceptual block diagram of an electronic circuit 10, according to an exemplary embodiment of the present invention. In the exemplary embodiment, electronic circuit 10 includes a bus interface unit 12, an instruction cache memory 14, an instruction buffer 16, an instruction dispatch unit 18, a control unit 20, a fixed point unit 22, a load/store unit 24, a floating point unit 26, general purpose registers 28, floating point registers 30 and a data cache memory 32.

Together, instruction buffer 16 and instruction dispatch unit 18 form an instruction buffer/dispatch unit. This instruction buffer/dispatch unit and control unit 20 form a control section, indicated by dashed enclosure 21, of electronic circuit 10. Also, electronic circuit 10 is connected to an external system clock line $CLK_{SYS}$, from which electronic circuit 10 inputs clock signals. Further, electronic circuit 10 is connected to a DC power source 33, such as a battery or an AC-to-DC converter, from which electronic circuit 10 receives power. For clarity, distribution of power from DC power source 33 throughout electronic circuit 10 is not shown in FIG. 1.

In the exemplary embodiment, electronic circuit 10 is a superscalar processor, fabricated as a CMOS integrated circuit. Electronic circuit 10 has three execution units, namely fixed point unit 22, load/store unit 24, and floating point unit 26. According to some previous techniques, an entire microprocessor can be placed in a low power mode by disabling power or by slowing clock signal transitions to the entire microprocessor, normally in response to a specified time elapsing without sensing processing activity by the microprocessor. Nevertheless, even when processing activity is occurring, not all sections of a microprocessor are actively processing information at the same time.

For example, electronic circuit 10 of FIG. 1 is a superscalar processor. Accordingly, floating point unit 26 does not process information if instruction dispatch unit 18 has dispatched only fixed point instructions and load/store instructions. Also, some buffer locations of instruction buffer 16 do not buffer information if instructions requested from instruction cache 14 are awaiting input by instruction cache 14 from bus interface unit 12. Similarly, fixed point unit 22 does not process information if it awaits input by data cache 32 of the information from bus interface unit 12.

Electronic circuit 10 is a CMOS circuit including multiple interconnects. CMOS circuits do not consume significant power if signals on interconnects are not actively transitioning between levels. If such interconnects are held in a steady state, then power consumption is reduced. For example, power consumption is reduced by holding a unit's latch data. Nevertheless, even if the unit's latch data are held constant, the unit's local clock regenerators continue switching a significant amount of capacitance through clock signal lines distributed throughout the unit to various latches.

As discussed further hereinbelow in connection with FIG. 3, clock signal lines from a single clock regenerator can be distributed to more than 64 master/slave latch pairs within electronic circuit 10. Accordingly, local clock regenerators result in a significant amount of power consumption within electronic circuit 10. By some estimates, approximately 20%–30% of power consumption within a microprocessor is attributable to clock signal transitions distributed to latches from clock regenerators.

In a significant aspect of the exemplary embodiment, respective power consumptions in different sections of electronic circuit 10 are reduced if certain power saving hold conditions are satisfied, as discussed further hereinbelow in connection with FIGS. 2a–c and 3. More particularly, a section's power consumption is reduced by reducing a frequency of clock signal transitions from the section's local clock regenerators. In the exemplary embodiment, the frequency is reduced to zero. In this manner, the section's functional logic is stopped (or slowed if the frequency remains greater than zero). Accordingly, stopping or slowing the frequency of clock signal transitions reduces power consumption of the section's functional logic and of the section's clock signal lines distributed to latches.

Preferably, electronic circuit 10 is partitioned for the clock regenerators, so that latches sharing a common power saving hold condition are grouped together. Such grouping is a primary power reduction aspect of electronic circuit 10. By grouping clock regenerators and by detecting power saving hold conditions (as discussed further hereinbelow in connection with FIGS. 2a–c and 3), power is reduced on electronic circuit 10 because a majority of interconnects do not transition between levels unnecessarily. Relative to previous techniques, this results in substantially improved overall power efficiency.

In a significant power reduction aspect of the exemplary embodiment, instruction cache 14 includes a detection unit 34. Also, instruction dispatch unit 18 includes a detection unit 36. Similarly, data cache 32 includes a detection unit 38. Although detection units 34, 36, and 38 are shown as being integral with other units of electronic circuit 10, the detection units can be defined separately from the other units and yet still be integral with electronic circuit 10. Detection units 34, 36, and 38 detect power saving hold conditions as discussed further hereinbelow in connection with FIGS. 2a–c and 3.

Bus interface unit 12 is connected bi-directionally to a bus 40. Bus 40 is external to electronic circuit 10. Instruction cache 14 is coupled to bus interface unit 12 through a data input bus 42 and through an instruction address bus 44.

Instruction buffer 16 is coupled to instruction cache 14 through an instruction bus 46. Instruction dispatch unit 18 is coupled to instruction buffer 16 through an instruction bus 48. Instruction dispatch unit 18 is further coupled to instruction cache 14 through an instruction request bus 50. Fixed point unit 22 is coupled to instruction dispatch unit 18 through an instruction bus 52. Load/store unit 24 is coupled to instruction dispatch unit 18 through an instruction bus 54. Floating point unit 26 is coupled to instruction dispatch unit 18 through an instruction bus 56.

Moreover, fixed point unit 22 is coupled to general purpose registers 28 through a data bus 58. Floating point unit 26 is coupled to floating point registers 30 through a data bus 60. Also, load/store unit 54 is coupled to general purpose registers 28 through data bus 58. Load/store unit 54 is further coupled to floating point registers 30 through data bus 60.

Data cache 32 is coupled to load/store unit 24 through a bus 64. General purpose registers 28 are coupled to data cache 32 through a bus 66. Moreover, floating point registers 30 are coupled to data cache 32 through bus 66.

General purpose registers 28 are also coupled to fixed point unit 22 through a bus 68. Floating point registers 30 are coupled to floating point unit 26 through a bus 70. Data cache 32 is coupled to bus interface unit 12 through a bi-directional data bus 72. Further, data cache 32 is coupled to bus interface unit 12 through an address bus 74.

In a significant power reduction aspect of the exemplary embodiment, detection unit 34 is coupled to lookup logic in instruction cache 14 through a hold line 80a. Detection unit 34 is further coupled to bus interface unit 12 through a wakeup line 80b. Also, detection unit 34 is coupled to certain buffer locations of instruction buffer 16 through a hold line 80c.

Detection unit 36 is coupled to fixed point unit 22 through a hold line 82a. Further, detection unit 36 is coupled to load/store unit 24 through a hold line 82b. Also, detection unit 36 is coupled to floating point unit 26 through a hold line 82c.

Detection unit 38 is coupled to lookup logic in data cache 32 through a hold line 84a. Further, detection unit 38 is coupled to bus interface unit 12 through a wakeup line 84b. Also, detection unit 38 is coupled to fixed point unit 22 through a hold line 84c. Detection unit 38 is coupled to floating point unit 26 through a hold line 84d.

In operation, instruction dispatch unit 18 requests an output of instruction information from instruction cache 14 through instruction request bus 50. If instruction cache 14 contains a requested instruction, then instruction cache 14 outputs the requested instruction to instruction buffer 16 through instruction bus 46. After instruction buffer 16 inputs the requested instruction from instruction cache 14, instruction dispatch unit 18 inputs the requested instruction from instruction buffer 16 through instruction bus 48.

If instruction cache 14 does not contain a requested instruction, then instruction buffer 16 awaits an output by instruction cache 14 of the requested instruction. In such a situation, instruction cache 14 requests the instruction from bus interface unit 12 through instruction address bus 44, so that instruction buffer 16 awaits an input by instruction cache 14 of the requested instruction from bus interface unit 12. In response to such a request by instruction cache 14, bus interface unit 12 inputs the requested instruction through external system bus 40. After bus interface unit 12 inputs the requested instruction through external system bus 40, instruction cache 14 inputs the requested instruction from bus interface unit 12 through data input bus 42. A significant period of time can elapse before instruction cache 14 inputs the requested instruction from bus interface unit 12.

Accordingly, instruction cache 14 performs multiple operations, including:

Operation A—outputting an instruction to instruction buffer 16 through instruction bus 46; and Operation B—awaiting a requested instruction from bus interface unit 12 through instruction address bus 44.

A buffer location of instruction buffer 16 performs an operation, namely buffering information, in response to a subset (Operation A) of the operations of instruction cache 14. Such a buffer location further performs another operation, namely awaiting requested information, in response to another subset (Operation B) of the operation of instruction cache 14. Bus interface unit 12 performs an operation, namely inputting a requested instruction through external system bus 40, in response to a subset (Operation B) of the operations of instruction cache 14. As discussed further hereinbelow in connection with FIGS. 2a-c and 3, the exemplary embodiment advantageously reduces power consumption within electronic circuit 10 by dynamically responding to such relationships between operations.

Instruction dispatch unit 18 dispatches instructions to fixed point unit 22, to load/store unit 24 and to floating point unit 26. Fixed point unit 22 processes data input from general purpose registers 28 through data bus 58, in response to a subset of fixed point instructions output by instruction dispatch unit 18 through instruction bus 52. Similarly, floating point unit 26 processes data input from floating point registers 30 through data bus 60, in response to a subset of floating point instructions output by instruction dispatch unit 18 through instruction bus 56. Fixed point unit 22 outputs processed data to general purpose registers 28 through bus 68, and floating point unit 26 outputs processed data to floating point registers 30 through bus 70.

Load/store unit 24 processes data input from general purpose registers 28 (through data bus 58) and from floating point registers 30 (through data bus 60), in response to a subset of load/store instructions output by instruction dispatch unit 18 through instruction bus Load/store unit 24 outputs processed data to data cache 32 through bus 64.

Accordingly, instruction dispatch unit 18 performs multiple operations, including:

Operation A—dispatching a fixed point instruction to fixed point unit 22;

Operation B—dispatching a load/store instruction to load/store unit 24; and

Operation C—dispatching a floating point instruction to floating point unit 26.

Fixed point unit 22 performs an operation, namely processing data, in response to a subset (Operation A) of the operations of instruction dispatch unit 18. After processing data in response to all dispatched fixed point instructions, fixed point unit 22 further performs another operation, namely awaiting dispatch of another fixed point instruction, in response to a subset (Operations B and C) of the operations of instruction dispatch unit 18.

Also, load/store unit 24 performs an operation, namely processing data, in response to a subset (Operation B) of the operations of instruction dispatch unit 18. After processing data in response to all dispatched load/store instructions, load/store unit 24 further performs another operation, namely awaiting dispatch of another load/store instruction, in response to a subset (Operations A and C) of the operations of instruction dispatch unit 18.

Similarly, floating point unit 26 performs an operation, namely processing data, in response to a subset (Operation C) of the operations of instruction dispatch unit 18. After processing data in response to all dispatched floating point instructions, floating point unit 26 further performs another operation, namely awaiting dispatch of another floating point instruction, in response to a subset (Operations A and B) of the operations of instruction dispatch unit 18.

As discussed further hereinbelow in connection with FIGS. 2a-c and 3, the exemplary embodiment advantageously reduces power consumption within electronic circuit 10 by dynamically responding to such relationships between operations.

Where fixed point unit 22 is instructed to process data, and such data are not contained in general purpose registers 28, then fixed point unit 22 awaits an output of such data information from data cache 32 through general purpose registers 28 and bus 66. Similarly, where floating point unit 26 is instructed to process data, and such data are not contained in floating point registers 30, then floating point unit 26 awaits an output of such data information from data cache 32 through floating point registers 30 and bus 66.

If data cache 32 does not contain data requested by load/store unit 24 for fixed point unit 22 (or for floating point unit 26), then data cache 32 requests the data from bus interface unit 12 through address bus 74, so that fixed point unit 22 (or floating point unit 26) awaits an input by data cache 32 of the requested data from bus interface unit 12. In response to such a request by data cache 32, bus interface unit 12 inputs the requested data through external system bus 40. After bus interface unit 12 inputs the requested data through external system bus 40, data cache 32 inputs the requested data from bus interface unit 12 through data bus 72. A significant period of time can elapse before data cache 32 inputs the requested data from bus interface unit 12.

Accordingly, data cache 32 performs multiple operations, including:

Operation A—outputting data to fixed point unit 22;

Operation B—outputting data to floating point unit 26; and

Operation C—awaiting requested data from bus interface unit 12 through address bus 74.

Fixed point unit 22 performs an operation, namely processing data, in response to a subset (Operation A) of the operations of data cache 32. Fixed point unit 22 further performs another operation, namely awaiting information, in response to another subset (Operation C) of the operations of data cache 32.

Floating point unit 26 performs an operation, namely processing data, in response to a subset (Operation B) of the operations of data cache 32. Floating point unit 26 further performs another operation, namely awaiting information, in response to another subset (Operation C) of the operations of data cache 32.

Bus interface unit 12 performs an operation, namely inputting requested data through external system bus 40, in response to a subset (Operation C) of the operations of data cache 32. As discussed further hereinbelow in connection with FIGS. 2a–c and 3, the exemplary embodiment advantageously reduces power consumption within electronic circuit 10 by dynamically responding to such relationships between operations.

Figure 2B:
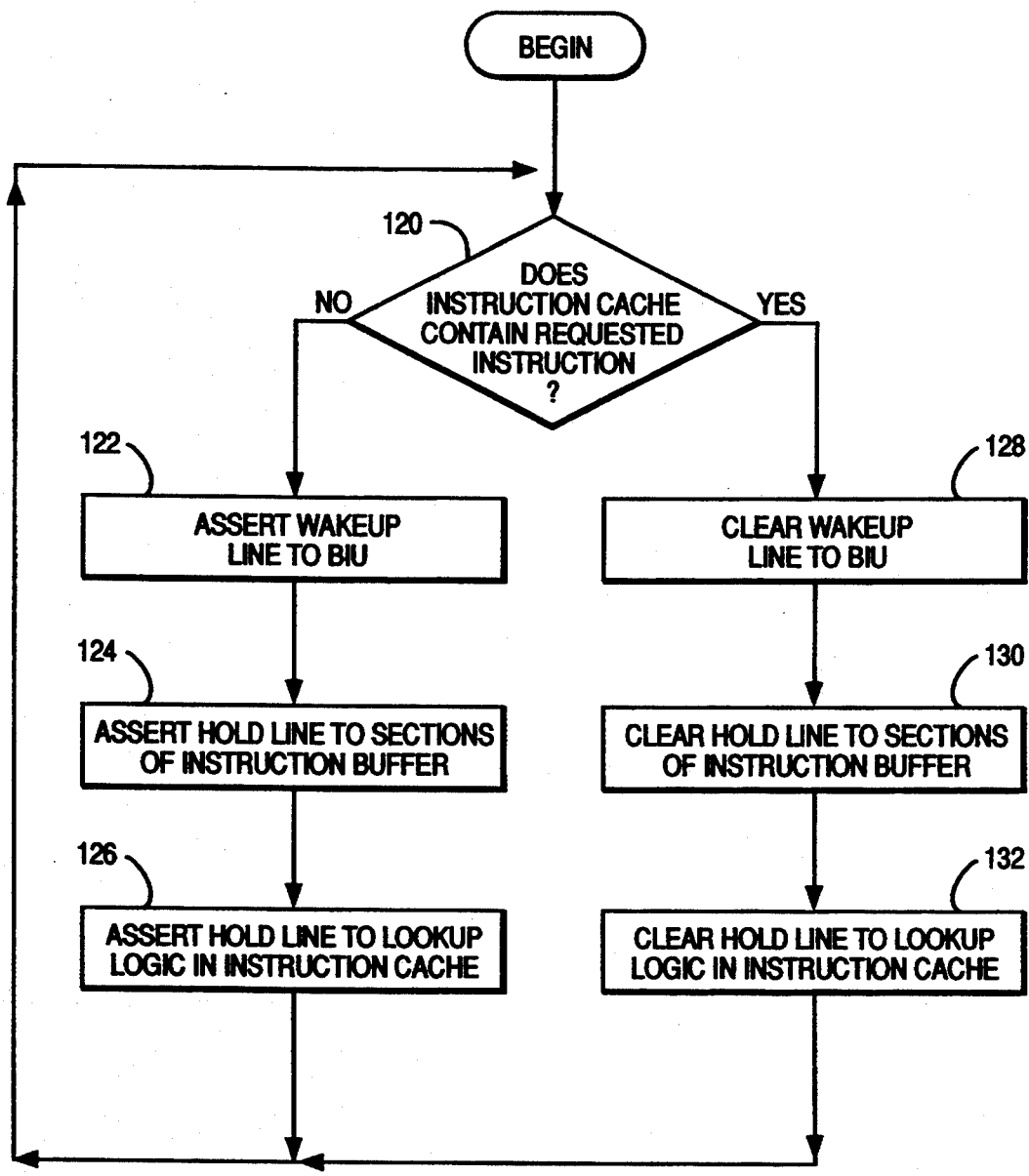
Figure 2C:
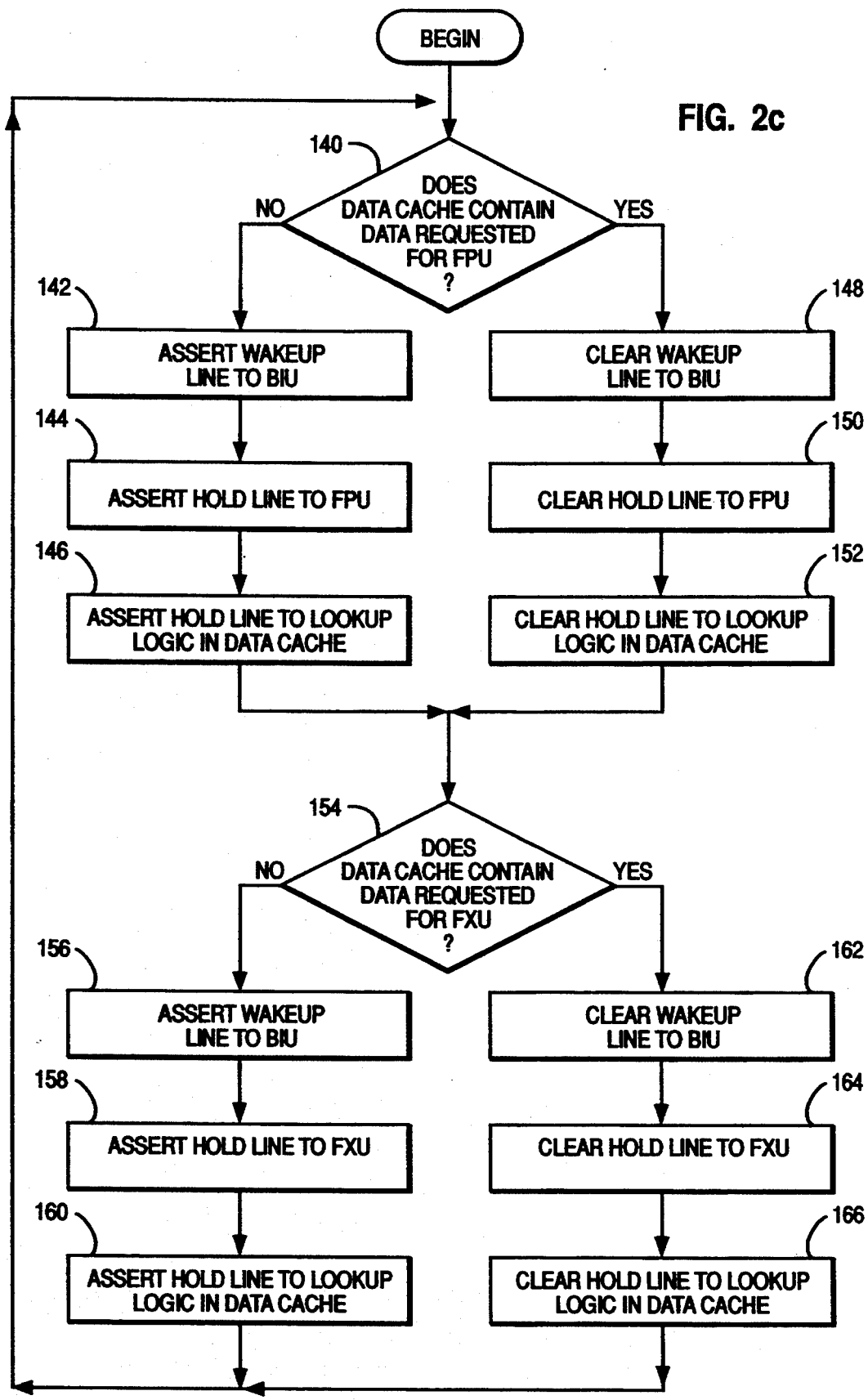

FIGS. 2a–c are flow charts of a method of reducing power in electronic circuit 10, according to the exemplary embodiment. More particularly, FIGS. 2a–c describe the operation of detection units 34, 36 and 38 of FIG. 1. FIG. 2a describes the operation of detection unit 36, which is integral with instruction dispatch unit 18.

Referring to FIG. 2a, execution begins at a decision block 100 where detection unit 36 determines whether any instruction belonging to the subset of floating point instructions is being dispatched by instruction dispatch unit 18 to floating point unit 26. If no instruction belonging to the subset of floating point instructions is being dispatched, then at a step 102 detection unit 36 generates a hold signal by asserting hold line 82c to floating point unit 26. In an instruction belonging to the subset of floating point instructions is being dispatched, then at a step 104 detection unit 36 clears hold line 82c to floating point unit 26.

After either step 102 or step 104, execution continues to a decision block 106 where detection unit 36 determines whether any instruction belonging to the subset of load/store instructions is being dispatched by instruction dispatch unit 18 to load/store unit 24. If no instruction belonging to the subset of load/store instructions is being dispatched, then at a step 108 detection unit 36 generates a hold signal by asserting hold line 82b to load/store unit 24. If an instruction belonging to the subset of load/store instructions is being dispatched, then at a step 110 detection unit 36 clears hold line 82b to load/store unit 24.

After either step 108 or 110, execution continues to a decision block 112 where detection unit 36 determines whether any instruction belonging to the subset of fixed point instructions is being dispatched by instruction dispatch unit 18 to fixed point unit 22. If no instruction belonging to the subset of fixed point instructions is being dispatched, then at a step 114 detection unit 36 generates a hold signal by asserting hold line 82a to fixed point unit 22. If an instruction belonging to the subset of fixed point instructions is being dispatched, then at a step 116 detection unit 36 clears hold line 82a to fixed point unit 22. After either step 114 or 116, execution returns to decision block 100.

FIG. 2b describes the operation of detection unit 34, which is integral with instruction cache 14. Referring to FIG. 2b, execution begins at a decision block 120 where detection unit 34 determines whether instruction cache 14 contains an instruction requested by instruction dispatch unit 18. If instruction cache 14 does not contain the requested instruction, then the requested output to instruction buffer 16 is awaiting input by instruction cache 14 of the instruction.

In such a situation, at a step 122 detection unit 34 generates a wakeup signal by asserting wakeup line 80b to bus interface unit 12. After step 122, execution continues to a step 124 where detection unit 34 generates a first hold signal by asserting hold line 80c to buffer locations of instruction buffer 16. After step 124, execution continues to a step 126 where detection unit 34 generates a second hold signal by asserting hold line 80a to lookup logic in instruction cache 14.

If detection unit 34 determines at decision block 120 that instruction cache 14 does contain the requested instruction, then execution continues to a step 128 where detection unit 34 clears wakeup line 80b to bus interface unit 12. After step 128, execution continues to a step 130 where detection unit 34 clears hold line 80c to buffer locations of instruction buffer 16. After step 130, execution continues to a step 132 where detection unit 34 clears hold line 80a to lookup logic in instruction cache 14. After either step 126 or 132, instruction returns to decision block 120.

FIG. 2c describes the operation of detection unit 38, which is integral with data cache 32. Referring to FIG. 2c, execution begins at a decision block 140 where detection unit 38 determines whether data cache 32 contains data requested for floating point unit 26. If data cache 32 does not contain data requested for floating point unit 26, then the requested output to floating point unit 26 is awaiting input by data cache 32 of the data.

In such a situation, execution continues to a step 142 where detection unit 38 generates a wakeup signal by asserting wakeup line 84b to bus interface unit 12. After step 142, execution continues to a step 144 where detection unit 38 generates a first hold signal by asserting hold line 84d to floating point unit 26. After step 144, execution continues to a step 146 where detection unit 38 generates a second hold signal by asserting hold line 84a to lookup logic in data cache 32.

If detection unit 38 determines at decision block 140 that data cache 32 does contain data requested for floating point unit 26, then execution continues to a step 148 where detection unit 38 clears wakeup line 84b to bus interface unit 12. After step 148, execution continues to a step 150 where detection unit 38 clears hold line 84d to floating point unit 26. After step 150, execution continues to a step 152 where detection unit 38 clears hold line 84a to lookup logic in data cache 32.

After either step 146 or 152, execution continues to a decision block 154 where detection unit 38 determines whether data cache 32 contains data requested for fixed point unit 22. If data cache 32 does not contain data requested for fixed point unit 22, then the requested output to fixed point unit 22 is awaiting input by data cache 32 of the data.

In such a situation, execution continues to a step 156 where detection unit 38 generates a wakeup signal by asserting wakeup line 84b to bus interface unit 12. After step 156, execution continues to a step 158 where detection unit 38 generates a first hold signal by asserting hold line 84c to fixed point unit 22. After step 158, execution continues to a step 160 where detection unit 38 generates a second hold signal by asserting hold line 84a to lookup logic in data cache 32.

If detection unit 38 determines at decision block 154 that data cache 32 contains data requested for fixed point unit 22, then execution continues to a step 162 where detection unit 38 clears wakeup line 84b to bus interface unit 12. After step 162, execution continues to a step 164 where detection unit 38 clears hold line 84c to fixed point unit 22. After step 164, execution continues to a step 166 where detection unit 38 clears hold line 84a to lookup logic in data cache 32. After either step 160 or step 166, execution returns to decision block 140.

Figure 3:
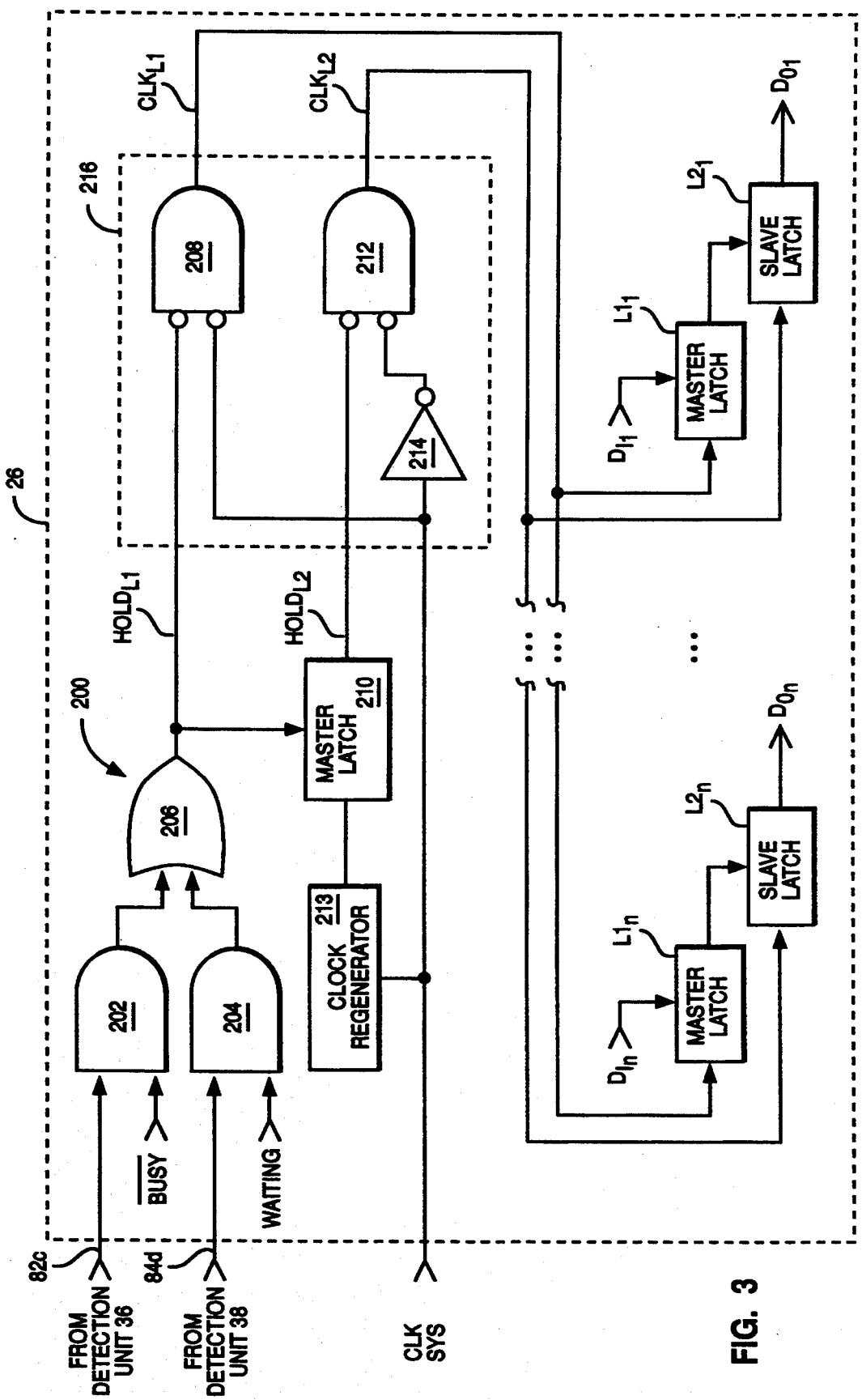
FIG. 3 is a schematic electrical circuit diagram of circuitry for reducing power in the electronic circuit of FIG. 1, according to the exemplary embodiment.

FIG. 3 is a schematic electrical circuit diagram of circuitry, indicated generally at 200, for reducing power in electronic circuit 10, according to the exemplary embodiment. Hold line 82c from detection unit 36 is connected to a first input of an AND gate 202. A NOT BUSY line is connected to a second data input of AND gate 202. Hold line 84d from detection unit 38 is connected to a first input of an AND gate 204. A WAITING line is connected to a second input of AND gate 204.

An output of AND gate 202 is connected to a first input of an OR gate 206. An output of AND gate 204 is connected to a second input of OR gate 206. An output of OR gate 206 is connected as a $HOLD_{L1}$ line to an inverted first input of an AND gate 208 and to a data input of a master latch 210. A data output of master latch 210 is connected as a $HOLD_{L2}$ line to an inverted first input of an AND gate 212.

System clock line $CLK_{SYS}$ is input by floating point unit 26. Likewise, system clock line $CLK_{SYS}$ is input by other units within electronic circuit 10 of FIG. 1. For clarity, distribution of system clock line $CLK_{SYS}$ throughout electronic circuit 10 is not shown in FIG. 1.

Referring to FIG. 3, system clock line $CLK_{SYS}$ is connected to an inverted second input of AND gate 208 and to a clock input of a clock regenerator 213. A clock output of clock regenerator 213 is connected to a clock input of master latch 210. Further, system clock line $CLK_{SYS}$ is connected to an input of an inverter 214. An output of inverter 214 is connected to an inverted second input of AND gate 212.

Together, inverter 214 and AND gates 208 and 212 form a clock regenerator indicated by dashed enclosure 216. Accordingly, clock regenerator 216 inputs signals from the $HOLD_{L1}$, $HOLD_{L2}$, and $CLK_{SYS}$ lines. From an output of AND gate 208, clock regenerator 216 outputs signals on a first clock output line $CLK_{L1}$. From an output of AND gate 212, clock regenerator 216 outputs signals on a second clock output line $CLK_{L2}$. Clock output line $CLK_{L1}$ of clock regenerator 216 is connected to respective clock inputs of master latches $L1_1$ through $L1_n$. Clock output line $CLK_{L2}$ of clock regenerator 216 is connected to respective clock inputs of slave latches $L2_1$ through $L2_n$.

A data input line $D_{I1}$ of floating point unit 26 is connected to a data input of master latch $L1_1$. A data output of master latch $L1_1$ is connected to a data input of slave latch $L2_1$. A data output of slave latch $L2_1$ is connected to a data output line $D_{O1}$ of floating point unit 26.

Likewise, a data input line $D_{In}$ of floating point unit 26 is connected to a data input of master latch $L1_n$. A data output of master latch $L1_n$ is connected to a data input of slave latch $L2_n$. A data output of slave latch $L2_n$ is connected to a data output line $D_{On}$ of floating point unit 26.

Figure 4:
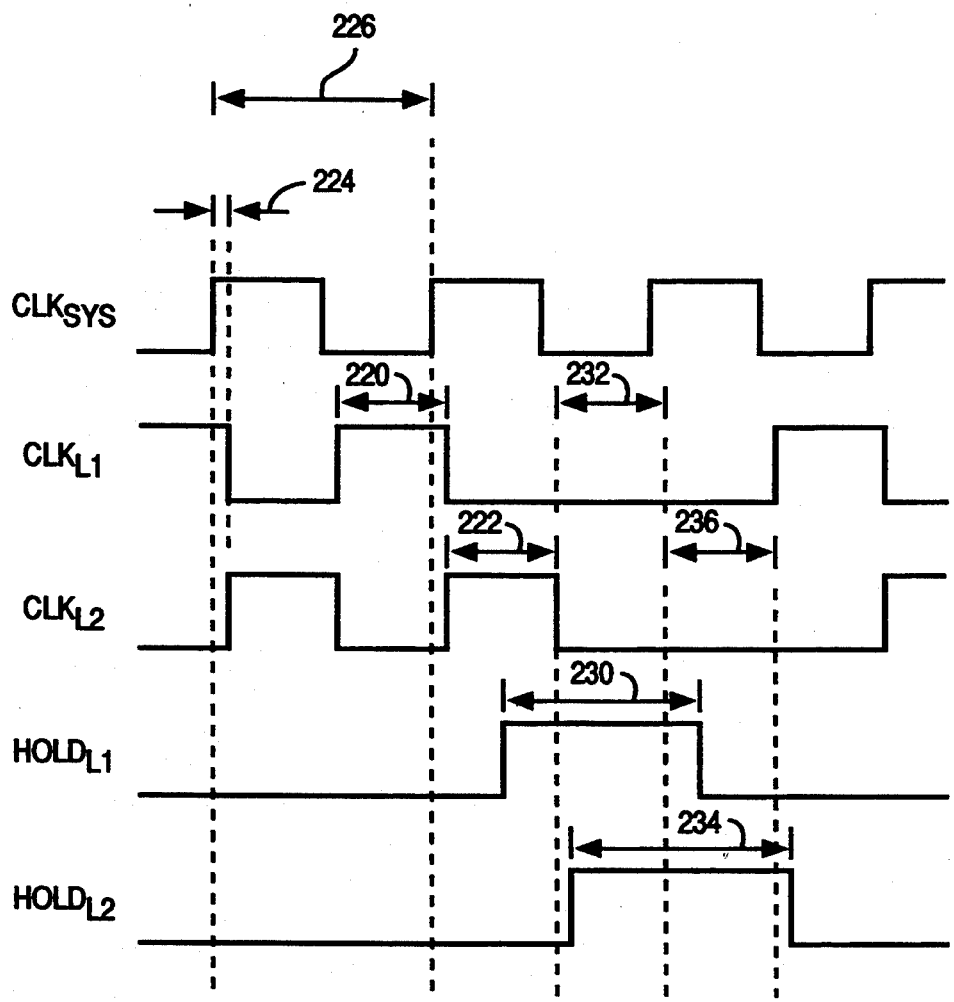
FIG. 4 is a timing diagram of clock signals of the circuitry of FIG. 3.

FIG. 4 is a timing diagram of clock signals of circuitry 200 of FIG. 3. Together, master latch $L1_1$ and slave latch $L2_1$ form a CMOS master/slave latch pair. In operation, master latch $L1_1$ latches the logic state of its data input $D_{I1}$ onto its data output in response to an active level 220 of a signal on clock line $CLK_{L1}$. Likewise, in response to an active level 222 of a signal on clock line $CLK_{L2}$, slave latch $L2_1$ latches the logic state of its data input onto its data output $D_{O1}$. In this manner, the CMOS master/slave latch pair operates as an edge-triggered latch. Other master/slave latch pairs, such as latches $L1_n$ and $L2_n$, within circuitry 200 operate in an identical manner. FIG. 4 further illustrates a delay 224 between a signal on $CLK_{SYS}$ and signals on clock lines $CLK_{L1}$ and $CLK_{L2}$, relative to a cycle 226 of $CLK_{SYS}$.

Referring again to FIG. 3, the output of OR gate 206 has a setup time that substantially matches the setup times of clock output lines $CLK_{L1}$ and $CLK_{L2}$ from clock regenerator 216. Notably, master latch 210 is interposed in the logic path from OR gate 206 to slave latches $L2_1$ through $L2_n$. In this manner, slave latches $L2_1$ through $L2_n$ are not driven by other slave latches, such as slave latches of detection units 36 and 38. Instead, slave latches $L2_1$ through $L2_n$ are driven by master latch 210, consistent with the pattern throughout electronic circuit 10 of master/slave latch pairs. Clock signal transitions from clock regenerator 213 to master latch 210 are output in response to clock signal transitions of $CLK_{SYS}$ and are always enabled.

Circuitry 200 as shown in FIG. 3 is only a partial representation of circuitry within floating point unit 26. As shown, floating point unit 26 includes multiple master/slave latch pairs. Clock signals from clock output lines $CLK_{L1}$ and $CLK_{L2}$ can be distributed from clock regenerator 216 to more than 32 master/slave latch pairs within electronic circuit 10.

Each data input, such as $D_{In}$ can be input either externally from outside floating point unit 26 or internally from within floating point unit 26. Likewise, each data output, such as $D_{On}$ can be output either externally outside floating point unit 26 or internally within floating point unit 26.

In operation, a NOT BUSY signal (i.e. assertion of the NOT BUSY line) is generated internally from within floating point unit 26 whenever a first operation (namely, awaiting dispatch of an instruction from instruction dispatch unit 18) of floating point unit 26 is being performed. Thus, the NOT BUSY signal is generated whenever floating point unit 26 awaits dispatch of an instruction from instruction dispatch unit 18. A WAITING signal (i.e. assertion of the WAITING line) is generated internally from within floating point unit 26 whenever a second operation (namely, awaiting information from data cache 32) of floating point unit 26 is being performed. Consequently, the WAITING signal is generated whenever floating point unit 26 awaits information from data cache 32.

Circuitry such as circuitry 200 is included in each of bus interface unit 12, instruction cache 14, instruction buffer 16, fixed point unit 22, load/store unit 24, floating point unit 26 and data cache 32. Accordingly, each of fixed point unit 22 and load/store unit 24 includes a respective NOT BUSY line and a respective WAITING line, identical in operation to those shown in FIG. 3. For purposes of illustration, FIG. 3 shows circuitry 200 applied to floating point unit 26, so that circuitry 200 is integral with floating point unit 26.

Similarly, each of instruction cache 14 and data cache 32 includes a respective WAITING line, which is asserted internally whenever an operation (namely, awaiting requested information from bus interface unit 12) is being performed. Also, each buffer location of instruction buffer 16 includes a respective NOT BUSY line, which is asserted internally whenever an operation (namely, awaiting information from instruction cache 14) of the buffer location is being performed. Bus interface unit 12 includes its own NOT BUSY line, which is asserted internally whenever an operation (namely, awaiting a request to transfer information between electronic circuit 10 and bus 40) of bus interface unit 12 is being performed.

Notably, referring to FIG. 1, the logic states of wakeup line 80b are inverted from the logic states of hold lines 80a and 80c, so that assertion of wakeup line 80b results in a logic zero state. By comparison, assertion of hold line 80a results in a logic one state. Likewise, the logic states of wakeup line 84b are inverted from the logic states of hold lines 84a, 84c and 84d, so that assertion of wakeup line 84b results in a logic state opposite from assertion of hold line 84a.

Referring again to FIG. 3, assertion of hold line 82c, together with assertion of the NOT BUSY line, results in assertion of the output of AND gate 202. Assertion of hold line 84d, together with assertion of the WAITING line, results in assertion of the output of AND gate 204. Assertion either of the output of AND gate 202 or of the output of AND gate 204 results in assertion of the $HOLD_{L1}$ line output from OR gate 206; otherwise, the $HOLD_{L1}$ line output from OR gate 206 is cleared. Significantly, the frequency of transitions of clock signals on $CLK_{L1}$ and $CLK_{L2}$ (which are input by latches $L1_1$ through $L1_n$ and $L2_1$ through $L2_n$) are adjusted in response to assertion or clearing of the $HOLD_{L1}$ line output from OR gate 206.

Referring to both FIG. 3 and FIG. 4, in response to assertion 230 of the $HOLD_{L1}$ line, the clock signals from $CLK_{SYS}$ are disabled from passing through AND gate 208 to clock output line $CLK_{L1}$, as illustrated by the continued clearing 232 of $CLK_{L1}$ during assertion 230 of $HOLD_{L1}$. In this manner, a frequency of transitions of the clock signals input by latches $L1_1$ through $L1_n$ is reduced to zero.

Moreover, in response to assertion 230 of the $HOLD_{L1}$ line, the $HOLD_{L2}$ line is asserted as illustrated in FIG. 4 at 234. In response to assertion 234 of the $HOLD_{L2}$ line, the clock signals from $CLK_{SYS}$ are disabled from passing through AND gate 212 to clock output line $CLK_{L2}$, as illustrated by the continued clearing 236 of $CLK_{L2}$ during assertion 234 of $HOLD_{L2}$. In this manner, a frequency of transitions of the clock signals input by latches $L2_1$ through $L2_n$ is reduced to zero.

In response to a subsequent clearing of the $HOLD_{L1}$ line, the clock signals from $CLK_{SYS}$ are enabled to pass through AND gates 208 and 212 to clock output lines $CLK_{L1}$ and $CLK_{L2}$. In this manner, a frequency of transitions of the clock signals input by latches $L1_1$ through $L1_n$ and $L2_1$ through $L2_n$ is increased.

In an alternative embodiment, the frequency of transitions of the clock signals input by latches $L1_1$ through $L1_n$ and $L2_1$ through $L2_n$ is not reduced to zero. Instead, the clock transitions are slowed. Moreover, using the basic technique of the exemplary embodiment, power consumption can be reduced within other types of electronic circuits besides microprocessors.

Advantageously, floating point unit 26 does not unnecessarily consume excess power while waiting for a timer to expire. Moreover, no interrupt is used to reenable clock signals to floating point unit 26 in response to an immediate need for the unit to perform an operation.

Instead, the exemplary embodiment reenables a unit of an electronic circuit in advance of its need to perform an operation, so that the exemplary embodiment is user transparent. Thus, no delay occurs between the time when the unit is needed to perform an operation and the time at which the unit is actually reenabled. Consequently, performance of the unit is not sacrificed by the exemplary embodiment, so it is fully transparent to a user of electronic circuit 10.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. Circuitry, comprising:
    an instruction dispatcher for dispatching at least one instruction and generating a first signal indicating whether said instruction is being dispatched by said instruction dispatcher;
    an execution unit coupled to said instruction dispatcher for receiving and processing said instruction and generating a second signal indicating whether said instruction is being processed by said execution unit; and
    circuitry coupled to said execution unit and to said instruction dispatcher for adjusting a frequency of clock transitions within said execution unit in response to said first and second signals.

2. The circuitry of claim 1 wherein said execution unit comprises a plurality of latches coupled to said adjusting circuitry for receiving said clock transitions.

3. The circuitry of claim 2 wherein said latches are complementary metal oxide semiconductor ("CMOS") latches.

4. The circuitry of claim 1 wherein said adjusting circuitry increases said frequency in response to said first signal indicating said instruction is being dispatched by said instruction dispatcher.

5. The circuitry of claim 4 wherein said adjusting circuitry increases said frequency in response to said second signal indicating said instruction is being processed by said execution unit.

6. The circuitry of claim 5 wherein said adjusting circuitry reduces said frequency in response to said first signal indicating said instruction is not being dispatched by said instruction dispatcher, while said second signal indicates said instruction is not being processed by said execution unit.

7. The circuitry of claim 1 wherein said adjusting circuitry increases said frequency in response to said second signal indicating said instruction is being processed by said execution unit.

8. The circuitry of claim 1 wherein said adjusting circuitry reduces said frequency in response to said first signal indicating said instruction is not being dispatched by said instruction dispatcher, while said second signal indicates said instruction is not being processed by said execution unit.

9. Circuitry, comprising:
a cache memory for outputting information and generating a first signal indicating whether said information is being output by said cache memory;
an input unit coupled to said cache memory for receiving and operating upon said information and generating a second signal indicating whether said information is being operated upon by said input unit; and
circuitry coupled to said input unit and to said cache memory for adjusting a frequency of clock transitions within said input unit in response to said first and second signals.

10. The circuitry of claim 9 wherein said input unit is an execution unit of a processor.

11. The circuitry of claim 9 wherein said input unit is an instruction buffer/dispatch unit of a processor.

12. The circuitry of claim 9 wherein said cache memory is an instruction cache memory.

13. The circuitry of claim 9 wherein said cache memory is a data cache memory.

14. The circuitry of claim 9 wherein said adjusting circuitry increases said frequency in response to said first signal indicating said information is being output by said cache memory.

15. The circuitry of claim 14 wherein said adjusting circuitry increases said frequency in response to said second signal indicating said information is being operated upon by said input unit.

16. The circuitry of claim 15 wherein said adjusting circuitry reduces said frequency in response to said first signal indicating said information is not being output by said cache memory, while said second signal indicates said information is not being operated upon by said input unit.

17. The circuitry of claim 9 wherein said adjusting circuitry increases said frequency in response to said second signal indicating said information is being operated upon by said input unit.

18. The circuitry of claim 9 wherein said adjusting circuitry reduces said frequency in response to said first signal indicating said information is not being output by said cache memory, while said second signal indicates said information is not being operated upon by said input unit.

19. Circuitry, comprising:
first circuitry for performing a first operation and generating a first signal indicating whether said first operation is being performed by said first circuitry;
second circuitry coupled to said first circuitry for performing a second operation and generating a second signal indicating whether said second operation is being performed by said second circuitry; and
third circuitry coupled to said first and second circuitry for adjusting power consumption within said second circuitry in response to said first and second signals.

20. The circuitry of claim 19 wherein said third circuitry adjusts said power consumption within said second circuitry by adjusting a frequency of clock transitions within said second circuitry.

21. The circuitry of claim 20 wherein said third circuitry reduces said frequency in response to said second signal indicating said second operation awaits said first operation while said first signal indicates said first operation is not being performed.

22. The circuitry of claim 21 wherein said third circuitry reduces said frequency to zero.

23. The circuitry of claim 20 wherein said third circuitry increases said frequency in response to said first signal indicating said first operation is being performed by said first circuitry.

24. The circuitry of claim 23 wherein said third circuitry increases said frequency in response to said second signal indicating said second operation is being performed by said second circuitry.

25. The circuitry of claim 24 wherein said third circuitry reduces said frequency in response to said second signal indicating said second operation awaits said first operation while said first signal indicates said first operation is not being performed.

26. The circuitry of claim 20 wherein said third circuitry increases said frequency in response to said second signal indicating said second operation is being performed by said second circuitry.

27. The circuitry of claim 19 wherein said third circuitry is integral with said second circuitry.

28. The circuitry of claim 19 wherein said first circuitry comprises:
operation circuitry for performing said first operation; and
detection circuitry coupled to said operation circuitry for detecting performance of said first operation and generating said first signal in response thereto.

29. The circuitry of claim 19 wherein said first circuitry further performs a third operation and generates a third signal indicating whether said third operation is being performed by said first circuitry.

30. The circuitry of claim 29 and further comprising fourth circuitry coupled to said first circuitry for performing a fourth operation and generating a fourth signal indicating whether said fourth operation is being performed by said fourth circuitry.

31. The circuitry of claim 30 and further comprising fifth circuitry coupled to said first and fourth circuitry for adjusting clock transitions within said fourth circuitry in response to said third and fourth signals.

32. A method, comprising the steps of:
performing a first operation with first circuitry;
performing a second operation with second circuitry;
generating a first signal indicating whether said first operation is being performed by said first circuitry;
generating a second signal indicating whether said second operation is being performed by said second circuitry; and
adjusting power consumption within said second circuitry in response to said first and second signals.

33. The method of claim 32 wherein said step of adjusting said power consumption comprises the step of adjusting a frequency of clock transitions within said second circuitry.

34. The method of claim 33 wherein said step of adjusting said clock transitions comprises the step of reducing said frequency in response to said second signal indicating said second operation awaits said first operation while said first signal indicates said first operation is not being performed.

35. The method of claim 34 wherein said step of reducing said frequency comprises the step of reducing said frequency to zero.

36. The method of claim 33 wherein said step of adjusting said clock transitions comprises the step of increasing said frequency in response to said first signal indicating said first operation is being performed by said first circuitry.

37. The method of claim 36 wherein said step of adjusting said clock transitions comprises the step of increasing said frequency in response to said second signal indicating said second operation is being performed by said second circuitry.

38. The method of claim 37 wherein said step of adjusting said clock transitions comprises the step of reducing said frequency in response to said second signal indicating said second operation awaits said first operation while said first signal indicates said first operation is not being performed.

39. The method of claim 33 wherein said step of adjusting said clock transitions comprises the step of increasing said frequency in response to said second signal indicating said second operation is being performed by said second circuitry.

40. The method of claim 32 and further comprising the steps of:
performing a third operation with said first circuitry; and
generating a third signal indicating whether said third operation is being performed by said first circuitry.

41. The method of claim 40 and further comprising the steps of:
performing a fourth operation with third circuitry; and
generating a fourth signal indicating whether said fourth operation is being performed by said fourth circuitry.

42. The method of claim 41 and further comprising the step of adjusting clock transitions within said third circuitry in response to said third and fourth signals.

* * * * *